May 20, 1941.   C. L. ORR   2,242,371
CAR TRUCK
Filed Dec. 19, 1938   8 Sheets-Sheet 1

Inventor
C. L. Orr,
By Seymour, Bright & Nottingham
Attorneys

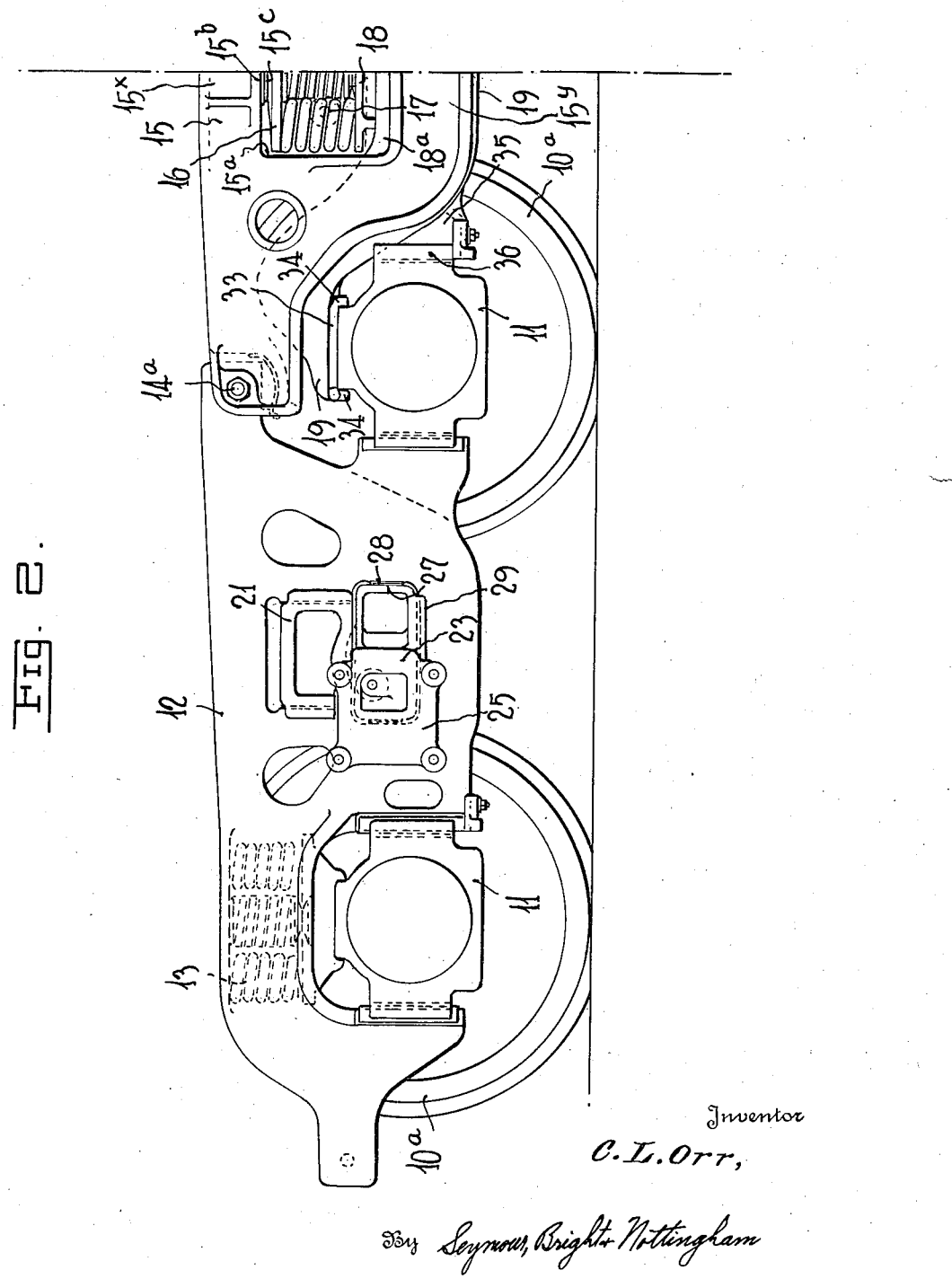

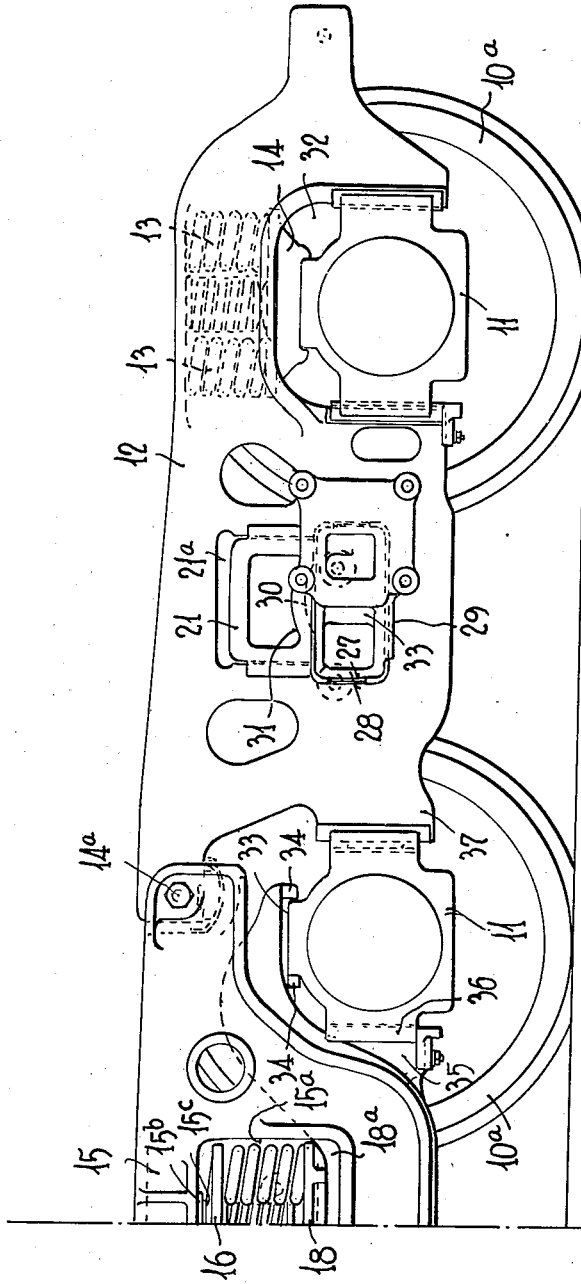

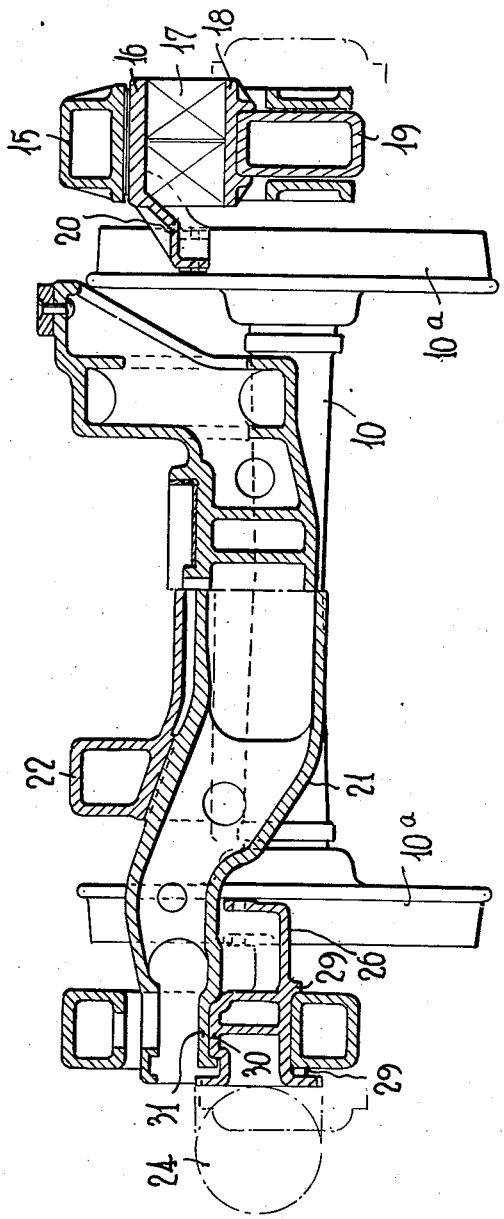

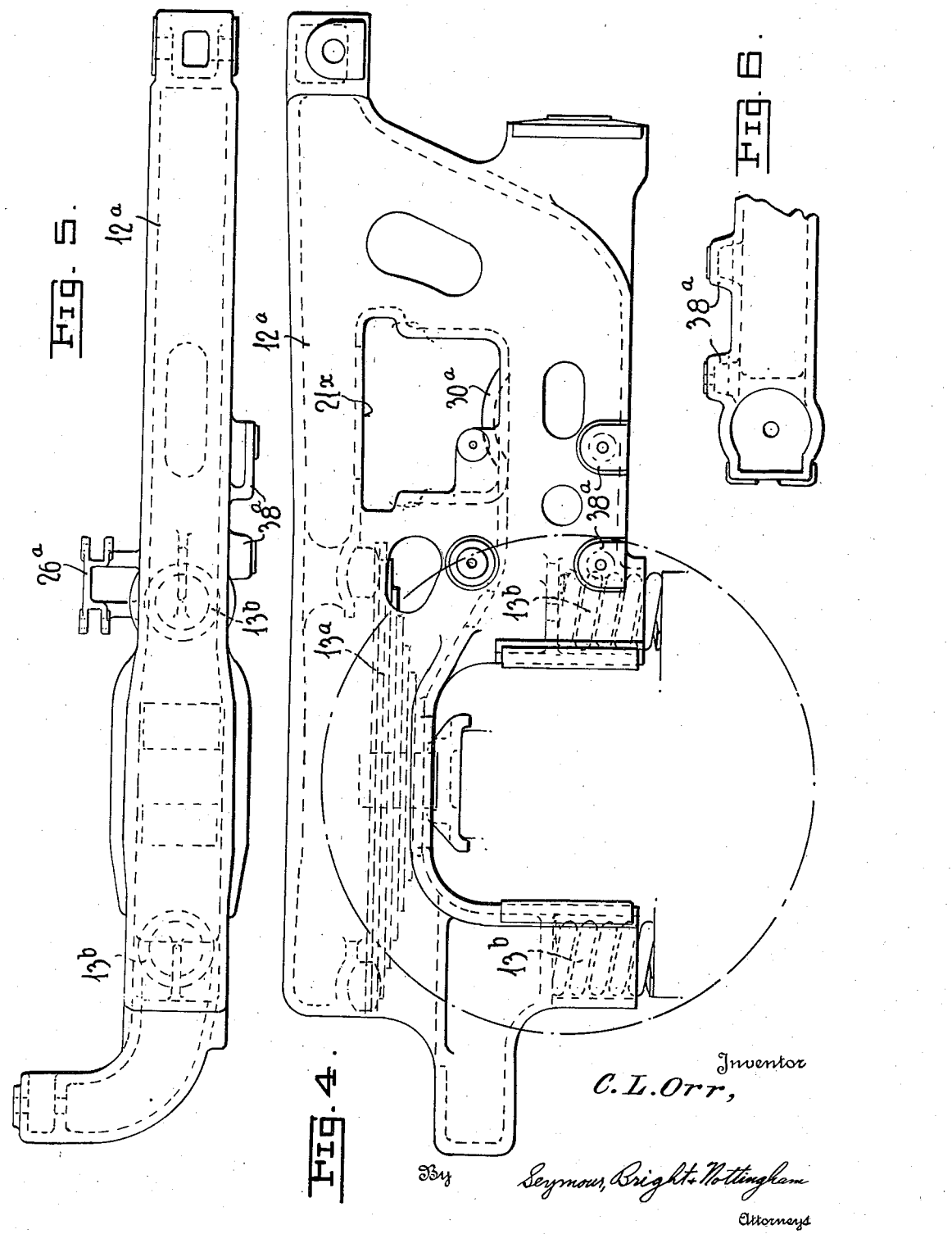

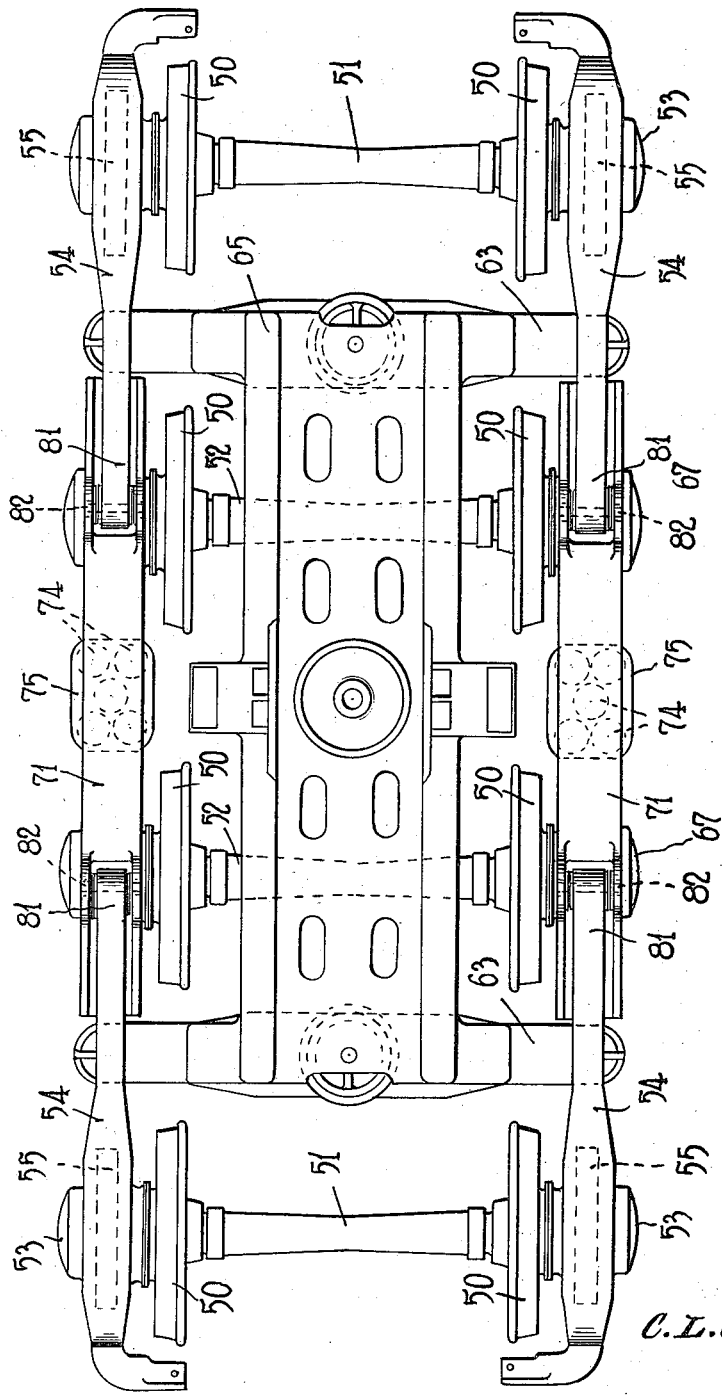

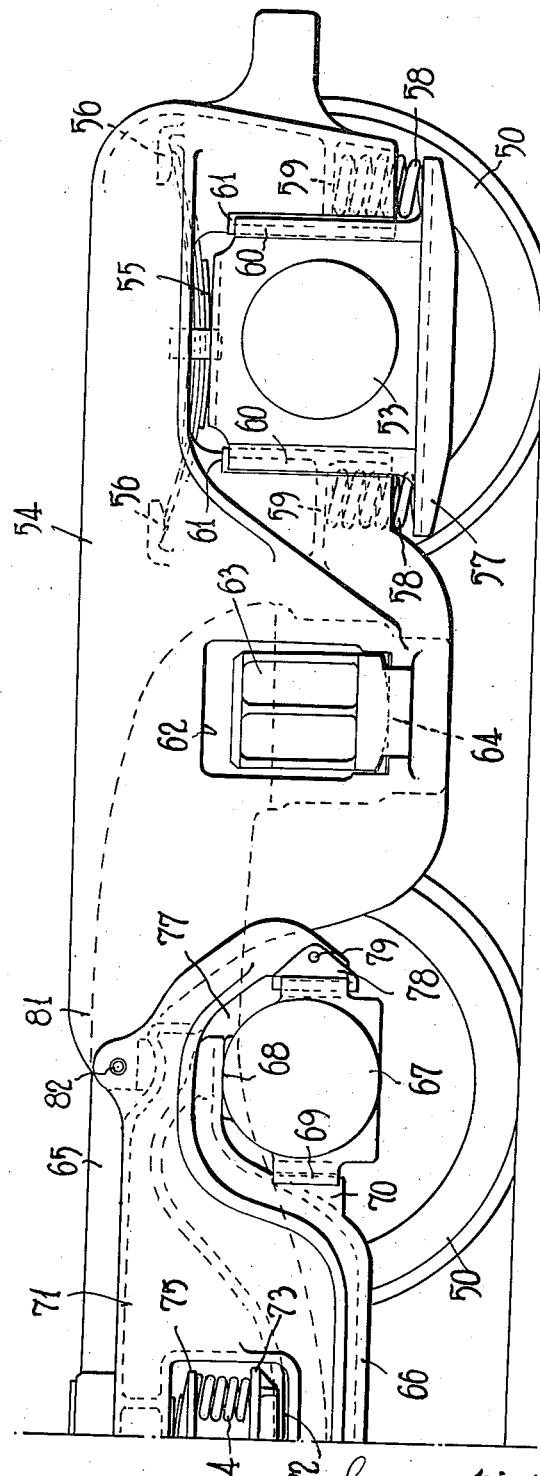

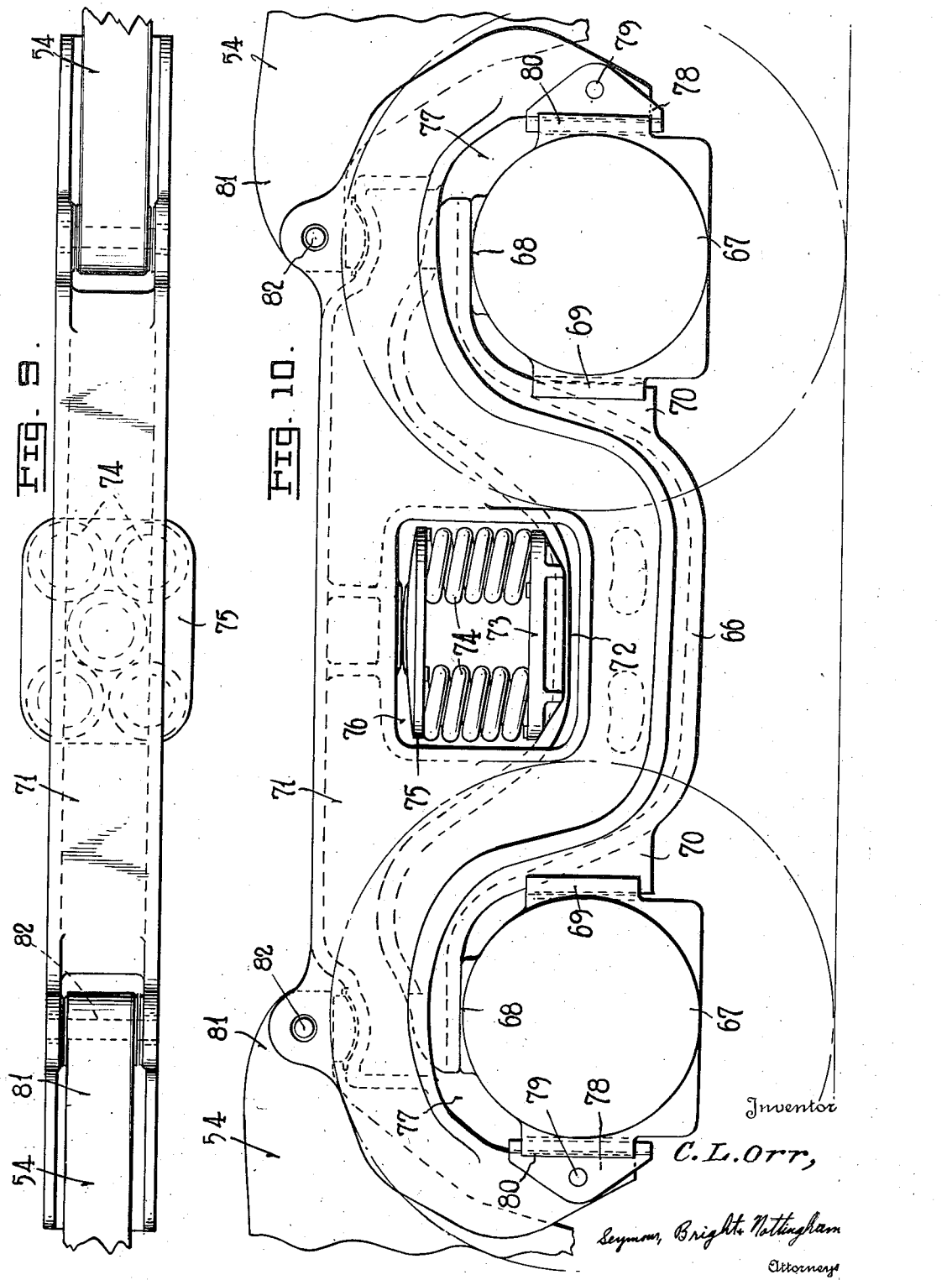

Patented May 20, 1941

2,242,371

UNITED STATES PATENT OFFICE 2,242,371

CAR TRUCK

Claude L. Orr, Columbus, Ohio, assignor to The Buckeye Steel Castings Company, Columbus, Ohio Application December 19, 1938, Serial No. 246,734

17 Claims. (Cl. 105—183)

The present invention pertains to eight-wheel car trucks and especially to trucks of the type disclosed in my application Serial No. 197,927, filed March 24, 1938.

As it is desirable to distribute the load of present day heavy railway vehicles running at high speeds, over a greater number of wheels, I have improved such trucks in order that high maintenance cost due to rapid deterioration of the wheels may be materially reduced.

When the number of axles and wheels per truck is increased, it is highly desirable to provide effective means of equalizing the loads on the wheels. Sluggish and improper equalization of the load on the truck to the wheels, due to track irregularities, cross-overs, etc., causes high maximum wheel loads and defeats the purpose of increasing the number of wheels per truck.

With the foregoing in mind, my improved truck construction has been conceived and designed with the following objects in view.

(1) To provide an effectively equalized eight-wheel truck, the equalizing system of which quickly responds to track irregularities, so each wheel carries only its proper proportion of the truck load.

(2) To furnish an eight-wheel truck in which the bolster system is maintained in a plane parallel to the vehicle body regardless of ordinary track conditions or differences in wheel diameters.

(3) To supply an eight-wheel truck having sufficient flexibility to negotiate curves, thereby reducing wheel flange pressures and lateral forces on journals as compared with rigid frame trucks.

(4) To provide an eight-wheel truck including end side frame members and intermediate side frame members, all of which are spring supported.

With the foregoing objects outlined and with other objects in view, the invention consists in the novel features hereinafter described in detail, illustrated in the accompanying drawings, and more particularly pointed out in the appended claims.

In the drawings:

Fig. 2 is an enlarged side elevation of one half of the structure shown in Fig. 1.

Fig. 2A is a similar view of the opposite half.

Fig. 3 is a transverse vertical sectional view taken on the line 3—3 of Fig. 1.

Fig. 4 is a side elevation of a modification of one of the end side frame members of the truck and showing springs which may be employed in mounting it on one of the journal boxes of an end axle of the truck.

Fig. 5 is a top plan view of the frame member which is illustrated in Fig. 4.

Fig. 6 is a bottom plan view of a portion of said side frame member.

Fig. 7 is a top plan view of another modification of an eight-wheel truck in accordance with the invention, with parts omitted which are unnecessary to a disclosure of the invention.

Fig. 8 is an enlarged side elevation of one-half of the structure shown in Fig. 7.

Fig. 9 is an enlarged top plan view of the medial portion of the side frame system of one side of the truck shown in Fig. 7.

Fig. 10 is an enlarged side elevation of the medial portion of the truck shown in Fig. 7.

Figure 1:
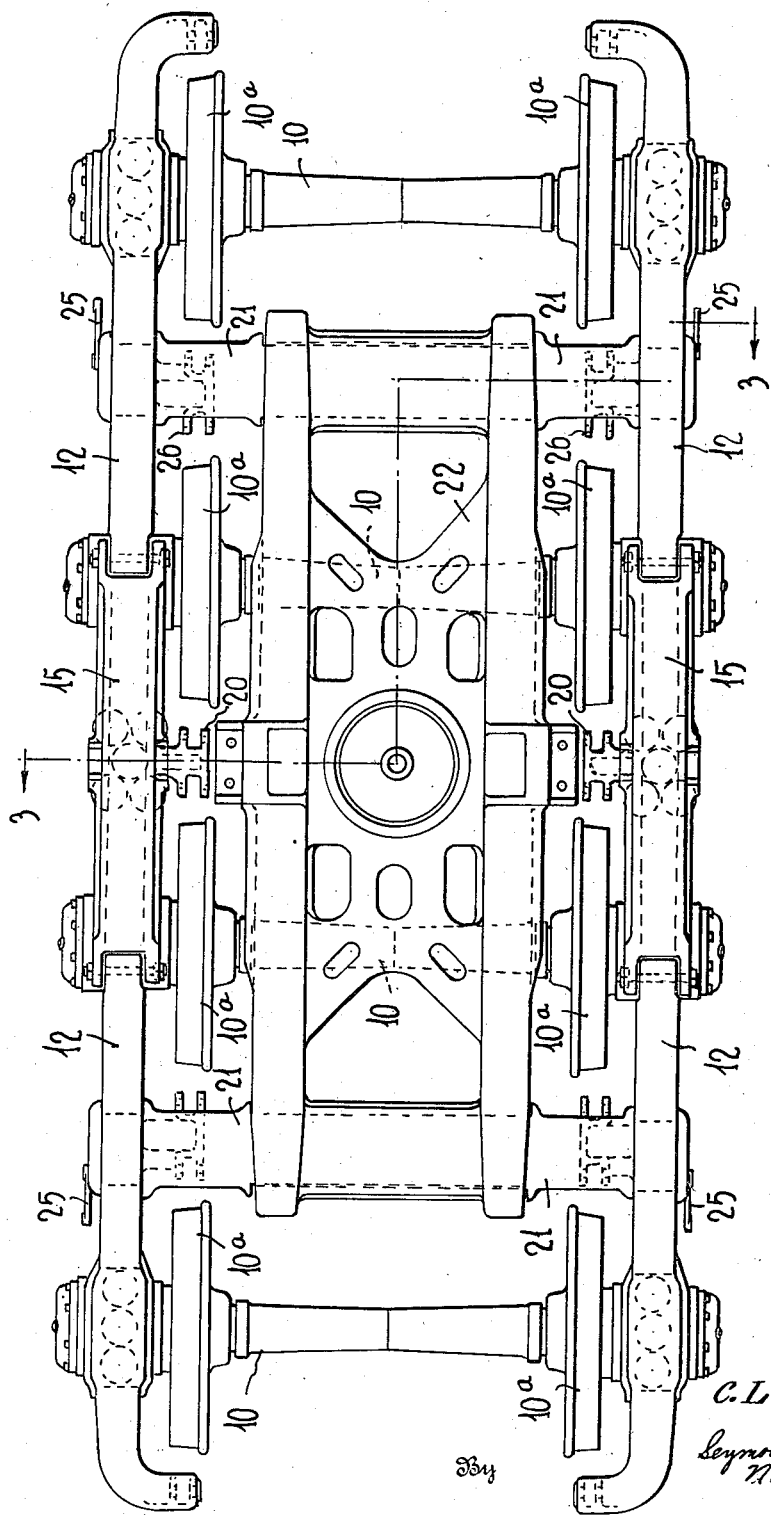
Fig. 1 is a top plan view of an eight-wheel truck in accordance with my invention, but with parts omitted which are unessential to a disclosure of the invention.

In the embodiment of the invention illustrated in Figs. 1 to 3 inclusive, 19 designates the axles of an eight-wheel truck having supporting wheels 10a. The ends of each end axle of the truck extend into journal boxes 11 which partially support end side frame members 12 by any suitable type of springs 13 which rest on spring seats 14 carried on top of the boxes 11.

The inner ends of the frame members 12 are connected at 14a to opposite ends of intermediate side frame members 15; the connections being such as to allow limited turning movement and endwise movement of the frame members relatively to one another.

Each of the members 15 has a transverse window 15a which is provided at its top with a flat surface 15b that rests on a curved surface 15c at the top of a spring cap 16, the latter being supported by any type of suitable springs 17 which rest on a spring seat 18; the seats at the opposite sides of the truck being carried by depressed intermediate portions 13a of equalizer members 19.

Each side frame member 15 is preferably of truss type and has an upper compression portion 15x and a lower tension portion 15y.

As best shown in Fig. 3, each of the caps 16 is provided at its inner edge portion with a brake hanger bracket 20 which is obviously spring supported due to the presence of the springs 17.

The bolster system of the truck is made up of transverse bolsters 21 and a center bolster 22, the latter having its ends resting on and supported by the transverse bolsters. The ends of the transverse bolsters extend into bolster openings 21a in the frame members 12 and they are supported by spacing members 23 which extend through the bolster openings and are carried by the members 12. The outer end of each member 23 forms a bracket 25 which may be employed to support an air cylinder 24 (Fig. 3) forming part of the braking system (not shown).

The inner end of each member 23 forms a brake hanger bracket 26.

Pads 27 are provided at opposite sides of each member 23 and they cooperate with pads 28 on the frame members 12 to prevent longitudinal movement of the members 23 relative to the frame members 12. Each member 23 is also provided with depending jaws or flanges 29 which engage opposite sides of a member 12 to prevent transverse movement of the member 23.

Since the side frame members 12 turn about the end axle journals due to the rocking movement of the intermediate frames, each member 23 is provided at its top with a parti-cylindrical surface 30 which cooperates with a similar surface 31 at the bottom of the transverse bolster to accommodate such movement.

The end axle pedestal openings 32 are of conventional type but the intermediate journal box mountings are of novel construction. The intermediate axles and journals are spaced by the equalizer members 19, the ends of which rest upon seats 33 at the tops of the intermediate journal boxes and are provided with depending lugs or flanges 34 which interlock with the journal boxes. Pedestal jaws 35 project from the equalizer members and extend into the space between flanges 36 of the intermediate journal boxes. There is no relative movement between the intermediate journal boxes and the equalizer members 19. The outer sides of the intermediate journal boxes are guided by pedestal brackets 37 which project from the end side frame members 12. These brackets move relatively to the intermediate journal boxes due to both spring travel and the rocking movement of the frame members 15.

Instead of making the end frame members as shown in Figs. 1 to 3 inclusive, I may make them as illustrated in Figs. 4 to 6 inclusive. In this form of the invention each end frame member 12a is provided at its outer side with apertured lugs 38a to which an air cylinder (not shown) of the braking system may be attached. In this modification it will be noted that the bolster opening 21x is of less height than in Fig. 2 as I do not use a spacing member 23 with this form of the invention. Instead the bottom of the bolster opening is arched as shown at 30a to receive the concave saddle 31 of a bolster of the type shown in Figs. 1 to 3 inclusive. Here also a brake hanger bracket 26a is rigidly united with the inner side of the member 12a and will function in the same manner as the bracket 26 illustrated in Fig. 3. This form of the end frame member 12a also accommodates leaf springs 13a and coil springs 13b which resiliently support the end frame on an end journal box (not shown).

Referring now to the embodiment of the invention illustrated in Figs. 7 to 10 inclusive, 50 designates wheels connected to end axles 51 and intermediate axles 52.

As best shown in Fig. 8, each end of each end axle is journalled in and supports a journal box 53 which in turn is designed to support and vertically guide an end side frame member 54. For example, each journal box may carry leaf springs 55, arranged on top of the journal box and having their ends engaging internal shelves or lugs 56 fixedly united with the end side frame member.

If necessary, the bottom of the journal box may be extended in opposite directions to form shelves 57 carrying coil springs 58 which also serve to support the end side frame member due to the fact that internal portions 59 of the member rest on the upper ends of the coil springs.

For guiding purposes, the journal box may be provided with oppositely projecting flanges 60 which cooperate with the vertical side walls 61 of the pedestal opening of the side frame member.

Each pair of oppositely disposed end side frame members of the truck is provided with a bolster opening 62 to receive the ends of a transverse bolster 63 which rests directly on the bolster seats 64.

A span bolster 65 has its ends resting on the transverse bolsters, and at this point, it may be noted that the spring supporting means for the end side frame members, and the design and support of the transverse bolsters may be the same as disclosed in the application of Jerome G. Bower, Serial No. 191,308, filed February 18, 1938. The span bolster may be of various designs and supported by the transverse bolsters in any suitable way. For examples, I may employ the designs and constructions disclosed in said Bower application or in my above-mentioned application.

In accordance with the present invention, equalizer members 66 have their ends resting on the intermediate journal boxes 67 as shown at 68, and flanges 69 at one side of each journal box 67 embrace extensions 70 projecting from the opposite ends of the equalizer members.

Each equalizer member is arranged within an intermediate side frame member 71 and has a depressed medial portion 72 supporting a spring seat 73. Any suitable type of resilient means such as coil springs 74 rest on the seats and support spring caps 75 on which rest the intermediate side frame members 71. Each member 71 is preferably provided with an opening or window 76 to accommodate and permit ready access to the parts 73, 74 and 75.

The end portions of each intermediate side frame member form pedestal openings 77 to accommodate the journal boxes 67, and each end of each member 71 has a pivotally connected shoe 78 extending on a horizontal pin 79 and embraced by guide flanges 80 extending from the adjacent journal box 67.

The inner ends of the end side frame members 54 form horns 81 which are pivotally connected at 82 by any suitable means to the end portions of the intermediate members 71 and are supported by such members, in any suitable way, for example as shown in Figs. 5 and 6 of my above-mentioned application.

During equalization operation there is relative vertical movement of the intermediate frame members 71 and the equalizers 66, which is accommodated at the pedestal openings 77 by means of the pivotal connections 79 between the shoes 78 and the intermediate frame members 71.

From the foregoing it is believed that the construction, operation and advantages of my improved trucks will be readily understood by those skilled in the art, and I am aware that changes may be made in the details disclosed without departing from the spirit of the invention as expressed in the claims.

What I claim and desire to secure by Letters Patent is:

1. In a railway car truck, wheel-supported axles having journal boxes, a side frame system at each side of the truck comprising a pair of end side frame members and a pair of intermediate members, one of the intermediate members yieldingly supporting the other one of the intermediate members, one of the intermediate members being an equalizer and the other an intermediate side frame member, one of the intermediate members being supported by intermediate journal boxes, the end frame members having their inner end portions movably connected to the end portions of the yieldingly supported intermediate member, and each end frame member being spring supported by one of the end journal boxes.

2. In a railway car truck, wheel-supported axles having journal boxes, a side frame system at each side of the truck comprising a pair of end side frame members and a pair of intermediate members, one of the intermediate members yieldingly supporting the other one of the intermediate members, one of the intermediate members being an equalizer and the other an intermediate side frame member, one of the intermediate members being supported by intermediate journal boxes, the end frame members having their inner end portions movably connected to the end portions of the yieldingly supported intermediate member, and each end frame member being spring supported by one of the end journal boxes, and transverse bolsters having their ends resting on opposite end side frame members of the truck.

3. In a railway car truck, wheel-supported axles having journal boxes, a side frame system at each side of the truck comprising a pair of end side frame members and a pair of intermediate members, one of the intermediate members yieldingly supporting the other one of the intermediate members, one of the intermediate members being an equalizer and the other an intermediate side frame member, one of the intermediate members being supported by intermediate journal boxes, the end frame members having their inner end portions movably connected to the end portions of the yieldingly supported intermediate member, and each end frame member being spring supported by one of the end journal boxes, transverse bolsters having their ends resting on opposite end side frame members of the truck, and another bolster having its ends resting on the transverse bolsters.

4. In a railway car truck, wheel-supported axles having journal boxes, a side frame system at each side of the truck comprising a pair of end side frame members, an intermediate side frame member, and an equalizer member, the equalizer members being supported by the intermediate journal boxes at opposite sides of the truck, springs supported by the equalizer members, said intermediate side frame members being supported by said springs, the end side frame members being mounted on the end journal boxes and having their inner ends movably connected to the intermediate side frame members and supported by the latter.

5. In a railway car truck, wheel-supported axles having journal boxes, a side frame system at each side of the truck comprising a pair of end side frame members, an intermediate side frame member and an equalizer member, the equalizer members being supported by the intermediate journal boxes at opposite sides of the truck, springs supported by the equalizer members, said intermediate side frame members being supported by said springs, the end side frame members being mounted on the end journal boxes and having their inner ends movably connected to the intermediate side frame members and supported by the latter, each end journal box carrying springs bearing the weight of the end side frame member that is mounted thereon.

6. In a railway car truck, wheel-supported axles having journal boxes, a side frame system at each side of the truck comprising a pair of end side frame members, an intermediate side frame member and an equalizer member, the equalizer members being supported by the intermediate journal boxes at opposite sides of the truck, springs supported by the equalizer members said intermediate side frame members being supported by said springs, the end side frame members being mounted on the end journal boxes and having their inner ends movably connected to the intermediate side frame members and supported by the latter, and transverse bolsters having their ends supported by the end side frame members.

7. In a railway car truck, wheel-supported axles having journal boxes, a side frame system at each side of the truck comprising a pair of end side frame members, an intermediate side frame member, an equalizer member, the equalizer members being supported by the intermediate journal boxes at opposite sides of the truck, springs supported by the equalizer members, said intermediate side frame members being supported by said springs, the end side frame members being mounted on the end journal boxes and having their inner ends movably connected to the intermediate side frame members and supported by the latter, transverse bolsters supported at their ends by the end side frame members, and another bolster supported at its ends by the transverse bolsters.

8. In a truck of the character described, wheel-supported axles, journal boxes carried by the axles, equalizers carried by the journal boxes and having end portions engaging the tops and certain sides of the journal boxes, springs supported by the equalizers midway the ends thereof, spring caps supported by the springs, side frame members supported by said spring caps and oscillatable about axes arranged about midway between the ends of the equalizers, said side frame members having pedestal openings to accommodate the journal boxes, and shoes pivotally connected to the ends of said side frame members and engaging other sides of said journal boxes.

9. In a truck of the character described, wheel-supported axles, journal boxes carried by the axles, equalizers having their ends supported by the journal boxes, springs supported by the medial portions of the equalizers, intermediate side frame members having their medial portions resting on the springs, the end portions of the side frame members having pedestal openings to accommodate said journal boxes, wheel-supported end frame members movably connected to the ends of the intermediate side frame members, and a bolster system supported by the end frame members.

10. In a truck of the character described, wheel-supported axles, journal boxes carried by the axles, equalizers having their ends supported by the journal boxes, springs supported by the medial portions of the equalizer members, intermediate side frame members having their medial portions resting on the springs, the end portions of the side frame members having pedestal openings to accommodate said journal boxes, wheel-supported end frame members movably connected to the ends of the intermediate side frame members, a bolster system supported by the end frame members, a spring cap between the springs and each side frame member, and the side frame members being rockable on said spring caps.

11. In a truck of the character described, wheel-supported intermediate and end axles, journal boxes carried by the axles, equalizer members having their ends resting on the journal boxes of the intermediate axles, springs carried by each equalizer member and arranged about midway the ends thereof, intermediate side frame members having their medial portions rockably mounted on said springs, end side frame members, springs supporting the end side frame members on the journal boxes of the end axles, means movably connecting the inner ends of the end side frame members to the ends of the intermediate side frame members, each end frame member being vertically guided by one of the journal boxes of an end axle and one of the journal boxes of an intermediate axle, and a bolster system having end portions supported by the end frame members at points positioned between the intermediate and end axles.

12. In a truck of the character described, wheel-supported axles, journal boxes carried by the axles, equalizers having their ends supported by the journal boxes, springs supported by the equalizers and arranged midway of the ends thereof, spring caps supported by the springs, and side frame castings having their medial portions rockably supported by said spring caps for oscillation about axes arranged about midway of the ends of the equalizers, said side frame castings being of the truss type and each having a compression portion and tension portion, the end portions of the side frame castings having pedestal openings to accommodate said journal boxes, each side frame casting having an unobstructed window about midway the ends thereof and arranged between its compression and tension portions to facilitate removal or replacement of the springs.

13. In a railway car truck, wheel-supported axles having journal boxes, a side frame system at each side of the truck comprising a pair of end side frame members and a pair of intermediate members, one of the intermediate members yieldingly supporting the other one of the intermediate members, one of the intermediate members being an equalizer and the other an intermediate side frame member, the equalizer being supported by intermediate journal boxes, the end frame members having their inner end portions movably connected to the end portions of the intermediate side frame member, and each end frame member being spring-supported by one of the end journal boxes.

14. In a truck of the character described, a side frame member having a bolster opening, a spacing member extending through said opening and resting on the side frame member, a transverse bolster having an end extending into said opening and resting directly on the spacing member, and an air cylinder supporting bracket rigidly united with the outer side of the spacing member and arranged at one end thereof.

15. In a truck of the character described, a side frame member having a bolster opening, a spacing member extending through said opening and resting on the side frame member, a transverse bolster having an end extending into said opening and supported by the spacing member, a brake hanger bracket rigidly united with one end portion of said spacing member, and an air cylinder supporting bracket rigidly united with the opposite end of the spacing member, and means interlocking the spacing member with the side frame member.

16. In a truck of the character described, wheel-supported axles, journal boxes carried by the axles, an equalizer having its ends supported by said journal boxes, springs supported by the equalizer, a spring cap supported by the springs, a side frame member rockably supported by said spring cap, the end portions of the side frame member having such configuration as to accommodate said journal boxes, and a brake hanger bracket supported by said spring cap.

17. In a truck of the character described, wheel-supported axles, journal boxes carried by the axles, an equalizer having its ends supported by said journal boxes, springs supported by the equalizer substantially midway between the ends thereof, a spring cap supported by the springs, a side frame member rockably supported by said spring cap, the end portions of the side frame member having such configuration as to accommodate said journal boxes, and a brake hanger bracket rigidly united with the spring cap.

CLAUDE L. ORR.